United States Patent [19]
Gallagher

[11] Patent Number: 5,632,504
[45] Date of Patent: May 27, 1997

[54] TRAILER SPRING

[76] Inventor: Daniel M. Gallagher, 10351 Hwy. 301 South, Dade City, Fla. 33525

[21] Appl. No.: 342,830
[22] Filed: Nov. 21, 1994
[51] Int. Cl.$^6$ ................................................. B60G 11/22
[52] U.S. Cl. ................................ 280/716; 280/414.1
[58] Field of Search ............................ 280/716, 688, 280/414.1; 267/292, 257

[56] References Cited

U.S. PATENT DOCUMENTS

| 2,971,771 | 2/1961 | Jewell | 267/292 |
|---|---|---|---|
| 2,982,536 | 5/1961 | Kordes . | |
| 3,120,952 | 2/1964 | Hendrickson . | |
| 3,122,245 | 2/1964 | MacKusick et al. | 280/414.1 |
| 3,215,384 | 11/1965 | Chambers . | |
| 3,220,746 | 11/1965 | Francis . | |
| 3,481,623 | 12/1969 | Campbell . | |
| 3,671,057 | 6/1972 | Cheers . | |
| 3,680,888 | 8/1972 | Hirst . | |
| 3,713,666 | 1/1973 | Cheers . | |
| 3,994,512 | 11/1976 | Parker | 280/687 |
| 4,000,914 | 1/1977 | Wragg | 280/716 |
| 4,132,433 | 1/1979 | Willetts | 280/716 |
| 4,166,640 | 9/1979 | Van Denberg . | |
| 4,733,855 | 3/1988 | Balezun | 267/294 |
| 4,995,636 | 2/1991 | Hall | 280/716 |
| 5,114,178 | 5/1992 | Baxter | 280/716 |
| 5,144,435 | 9/1992 | Taylor | 188/281 |
| 5,150,918 | 9/1992 | Heitzmann | 280/716 |

FOREIGN PATENT DOCUMENTS 2099380 12/1982 United Kingdom ............ 267/292

Primary Examiner—Kenneth R. Rice
Attorney, Agent, or Firm—Donald R. Bahr

[57] ABSTRACT

A trailer the spring for boat trailers the spring being readily fabricated from corrosion resistant materials and in particular aluminum, stainless steel and polymeric materials. The trailer spring has a base which is secured to a frame component. An elongated beam is pivotly attached to one end of the base such that the other end of the beam can pivot in relation to the base in a vertical fashion. Positioned between the pivoting end of the beam and the base is a section of an elastomeric material which may be compressed between the pivoting end of the beam and the base. The section of elastomeric material may be retained in a holder. In the preferred embodiment the beam has a U shaped cross section which has upstanding sidewalls which project around the base and the horizontal frame component when the spring is compressed. The projection of the beam around the base and frame component tends to increase the transverse stability of the trailer. Integral with the subject trailer spring is the trailer axle. The trailer spring of this invention is used in pairs.

19 Claims, 2 Drawing Sheets

TRAILER SPRING

FIELD OF THE INVENTION

This invention relates to a trailer spring and more particularly to a spring which is particularly suited for use on boat trailers in corrosive salt water environments. The spring of this invention can be readily fabricated from non ferrous materials and therefore its tendency to corrode is miminized. This invention is further concerned with a trailer spring which has a low operational profile thereby allowing the trailer and its load to have the lowest possible profile. This property is particularly advantageous with boat trailers where it is often necessary to store a trailer with a boat thereon in an enclosed space for example a garage. This low operating profile also permits utilization and the launching of a boat off the trailer in shallow water. The invention also relates to a trailer spring which can be readily fabricated from aluminum.

DESCRIPTION OF THE BACKGROUND ART

There are a wide variety of springs on the marketplace today which may function as trailer springs, These prior art devices include leaf springs which are made from ferrous alloys, fiber glass etc. other types of trailer springs include torsion springs coil springs and phenumatic springs. Still another type of trailer spring which is popular on boat trailers is a composite spring/axle assembly wherein the rotation of the axle compresses in a bar or plug of an elastomeric material. Because boat trailers must be submerged in usage the components of these trailers are subject to salt water corrosion. That is when a trailer is submerged in salt water the components are coated with salt water. When this salt water dries the surface of the trailer is coated with particulate salt crystals which are hydroscopic. These salt crystals continue to attract moisture out of the air and hence the trailer components continue to be exposed to a corrosive environment and in fact continue to corrode or rust. For many trailer components this corrosion problem has been overcome by use of aluminum components. The principal aluminum component utilized has beem aluminum I beams as major structural members. Regardless of the use of these non corrosive aluminum I beams the springs as used on boat trailers are still in most instances steel leaf springs as there are no effective alternatives available. These widely used steel leaf springs when used on boat trailers have a very limited life span when used in salt water. This limited life span results from the fact that the components literally corrode away for the reasons as stated above.

Typical prior art vehicle spring are disclosed in the patent literature. Consider, for example, U.S. Pat. No. 3,481,623 to Campbell; U.S. Pat. No. 3,215,384 to Chambers U.S. Pat. No. 4,733,855 to Balezun U.S. Pat. No. 982,536 to Kordes U.S. Pat. No. 5,114,178 to Baxter and U.S. Pat. No. 3,671,057 to Cheers.

Despite the large number of efforts to create a trailer spring which is particularly suitable for use on boat trailers which is functional and yet corrosion resistant, no prior art spring has the capability of the present invention which provides in a cost effective manner a combination of functionality low profile, and corrosion resistance.

Accordingly, it is an object of the present invention to provide a trailer spring which is corrosion resistance.

A further object of the present invention is to provide a trailer spring which can be easily and cheaply be fabricated from aluminum.

A further object of the present invention is to provide a trailer spring which has a low profile.

It is a further object of the present invention to provide trailer springs which will not fail as a result of corrosion.

These objects should be construed to be merely illustrative of some of the more prominent features and applications of the subject invention. Many other beneficial results can be obtained by applying the disclosed invention in a different manner or by modifying the invention within the scope of the disclosure. Accordingly, other objects and a more comprehensive understanding of the invention may be obtained by referring to the Summary of the Invention, and the Detailed Description of the Preferred Embodiment in addition to the scope of the invention defined by the claims taken in conjunction with the accompanying drawings.

SUMMARY OF THE INVENTION

The invention is defined by the appended claims with the specific embodiment shown in the attached drawings. For the purposes of summarizing the invention, the invention may be described as a vehicle spring which is particularly suited for use on boat trailers and in a corrosive salt water enviroment.

The trailer spring of this invention comprises a base which is attached to opposing side rails of a boat trailer. A beam is pivotally secured to one end of the base in such a manner that the opposite end of the bean can pivot in a vertical plane. Positioned under the pivoting end of the beam is a holder which retains and holds a block of an elastomeric material which is deformed when it is compressed by the movement of the beam. A piston is further provided which rides in the holder and biases the elastomeric block into a compressed mode.

The base, beam and holder and piston may be fabricated from non corrosion resistant materials. In the preferred embodiment the base, beam and holder are fabricated from aluminum and the piston is fabricated from a thermoplastic material. In order to complete the corrosion resistance of the spring of this invention stainless steel fasteners are used therewith.

The foregoing has outlined rather broadly, the more pertinent and important features of the present invention. The detailed description of the invention that follows is offered so that the present contribution to the art may be more fully appreciated. Additional features of the invention will be described hereinafter. These form the subject of the claims of the invention. It should be appreciated by those skilled in the art that the conception and the disclosed specific embodiment may be readily utilized as a basis for modifying or designing other structures for carrying out the same puirposes of the present invention. It should also be realized by those skilled in the art that such equivalent structures do not depart from the spirit and scope of the invention as set forth in the appended claims.

BRIEF DESCRIPTION OF THE DRAWINGS

For a better understanding of the nature and objects of the invention, reference should be directed to the following description taken in conjunction with the accompanying drawings in which.

Similar reference numerals refer to similar parts throughout the several Figures.

DESCRIPTION OF THE PREFERRED EMBODIMENT

Figure 1:
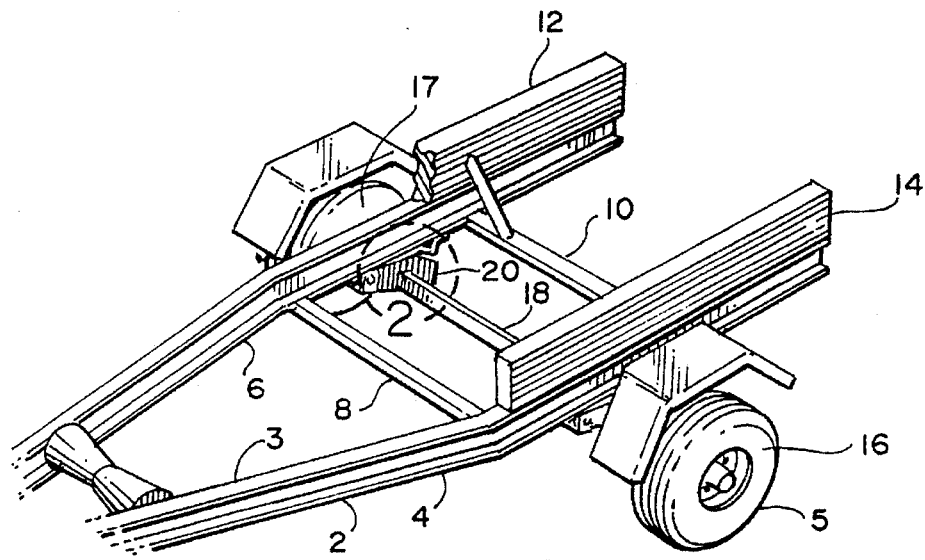
FIG. 1 is a perspective view showing a trailer which incorporates the spring of the present invention.

Referring to FIG. 1 it can be seen that spring 20 connects chassis 3 of trailer 2 to running gear 5.

Chassis 3 normally comprises a pair of I beam frame members 4 and 6, a pair of opposing bunks 12 and a pair of support members 8 and 10. The illustrated embodiment of trailer 2 is particularly suited for supporting a boat.

Running gear 5 generally comprises an axle 18 and a pair of wheels 16 and 17.

Running gear 5 is interconnected to chassis 3 via a pair of springs 20 which are the subject of this invention, only one of which is shown.

Figure 2:
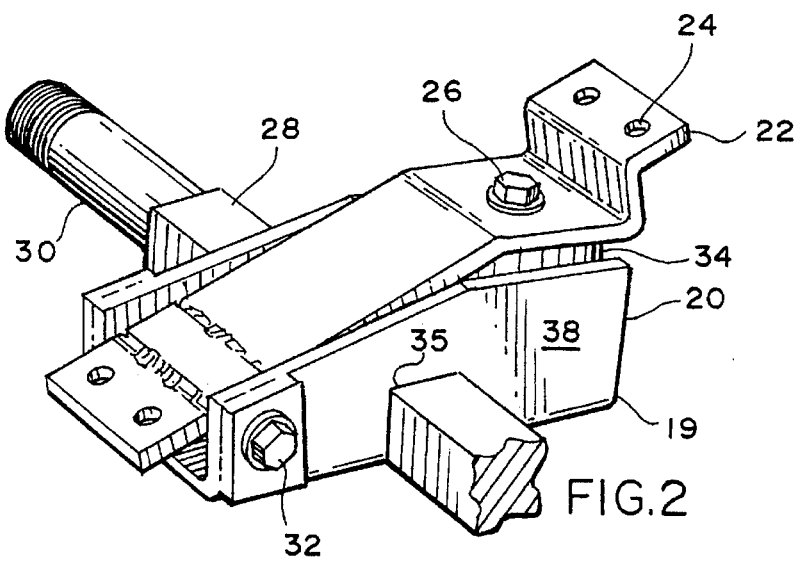
FIG. 2 is a sectional view of the trailer spring of this invention taken in area 2 of FIG. 1.
Figure 6:
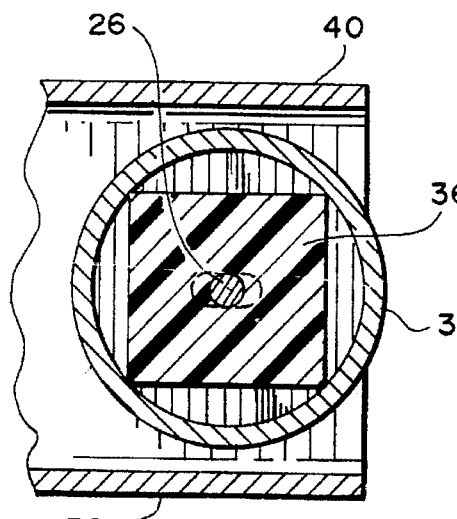
FIG. 6 is a cut away top view showing the spring of this invention in an uncompressed state.
Figure 7:
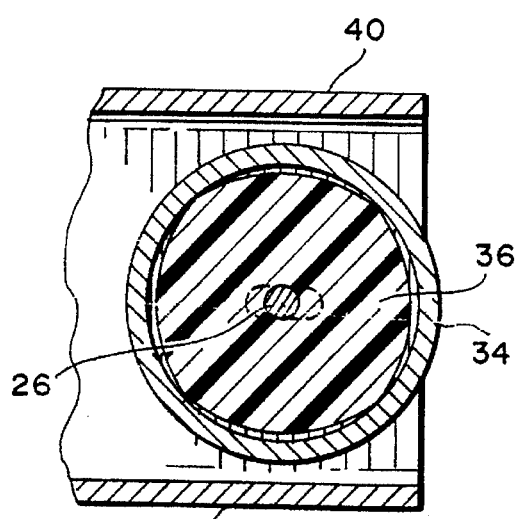
FIG. 7 is a cut away top view showing the spring of this invention in a compressed state.

FIG. 2 shows in greater detail the component parts of spring 20. In the illustrated embodiment spring 20 comprises a base member 22 which incorporates a plurality of apertures 24 wherein a pair of springs 20 may be attached to I beams 4 and 6 of trailer 2.

Spring 20 further incorporates a beam member 19 and a holder 34.

As illustrated in FIG. 2 spring 20 is used in conjunction with an axle 28 which incorporates a spindle 30 which is adapted to receive a wheel hub assembly not shown. Axle 28 passes through a pair of apertures 35 which are integral with beam 19 only being shown in FIG. 2.

In the preferred embodiment axle 28 is secured to beam 38 by welding. It is understood by in one skilled in the art that other means of attaching axle 28 to beam member 38 may be utilized.

Figure 3:
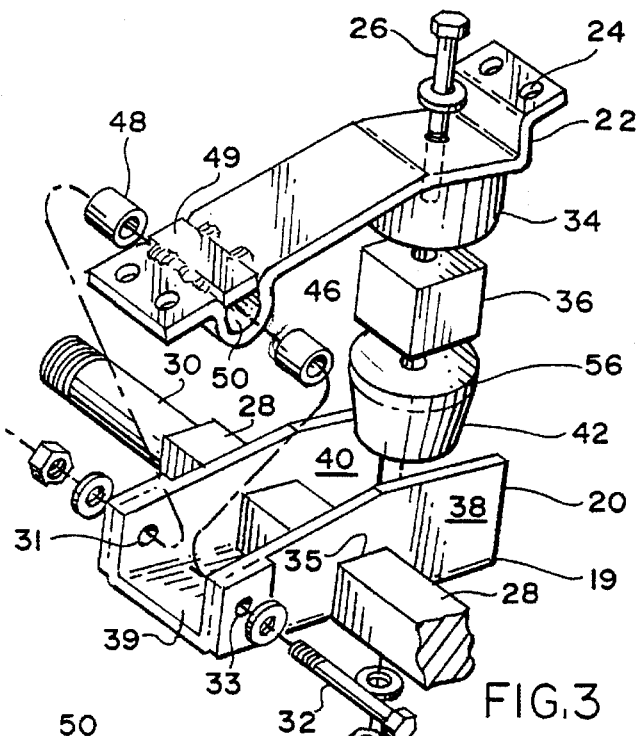
FIG. 3 is a perspective view showing the assembly of the various components of the spring of this invention.

FIG. 3 further illustrates the components of spring 20. In this figure it can be seen that holder 34 is integral with base 22. In the preferred embodiment of this invention holder 34 is welded to base 22.

While not illustrated it is understood by one unskilled in the art that holder 34 could be secured to beam 38 by other means.

The first end of base 22 incorporates a journal 50 which is formed by a depression in the main body section of base 22. Plate 49 is welded in place in order to complete journal 50.

Journal 50 is adapted to receive a pair of polymeric bearings 46 and 48. The function of these bearings will be described herein below.

As can be seen, the first end of beam 19 is pivotally secured to the first end of base 22 by a bolt and nut assembly 32 which passes through apertures 31 and 33 which are located on the first end of beam 26. As is illustrated bolt 32 passes through bearings 46 and 48 which are positioned in journal 50 thereby pivotally securing the first end of base 22 to the first end of beam 19.

As was mentioned above holder 34 is secured to base 22. Positioned in holder 34 is an elastomeric block of a polymeric material 36 which functions as the energy absorbing means of spring 20, elastomeric block 36 may be formed from any convenient elastomeric material such as natural rubber, polybutadiene, polyurethane, etc. The physical properties of elastomeric block 36 must be matched to the desired load carrying capacity of spring 20.

Further positioned between base 22 and beam 19 is piston 42 which is adapted to fit in holder 34. Piston 42 further incorporates a chamfer 56 which assist in the movement of piston 42 in holder 34.

Further it can be seen from FIG. 3 that beam 19 incorporates a pair of opposing side walls 38 and 40 and a byte section 39.

Figure 4:
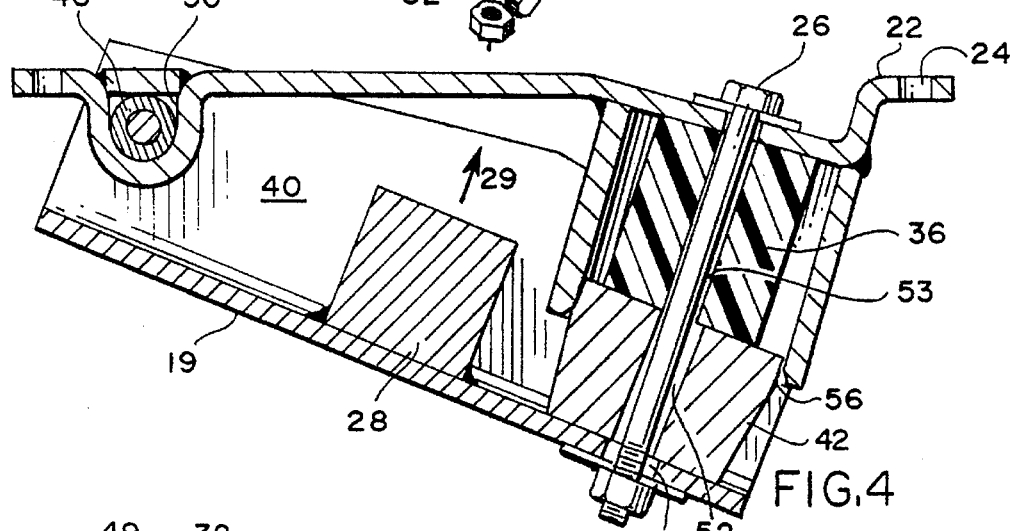
FIG. 4 is a cut away side view showing the spring of this invention in an uncompressed state.

In addition to pivotally being tied together by bolt and nut assembly 32 as is described above the second end of base 22 is connected to second end of beam 19 by bolt and nut assembly 26 as is clearly shown in FIG. 4. Bolt and nut assembly 26 further restricts the pivotal movement of beam 19 in relation to base 22.

FIG. 4 shows spring 20 in a uncompressed state. As can be seen from an examination of FIG. 4 base 22 incorporates an oversized aperture 56, block 36 incorporates an oversized aperture 53, piston 42 incorporates an oversized aperture 52 and beam member 19 incorporates an oversized aperture 58.

Figure 5:
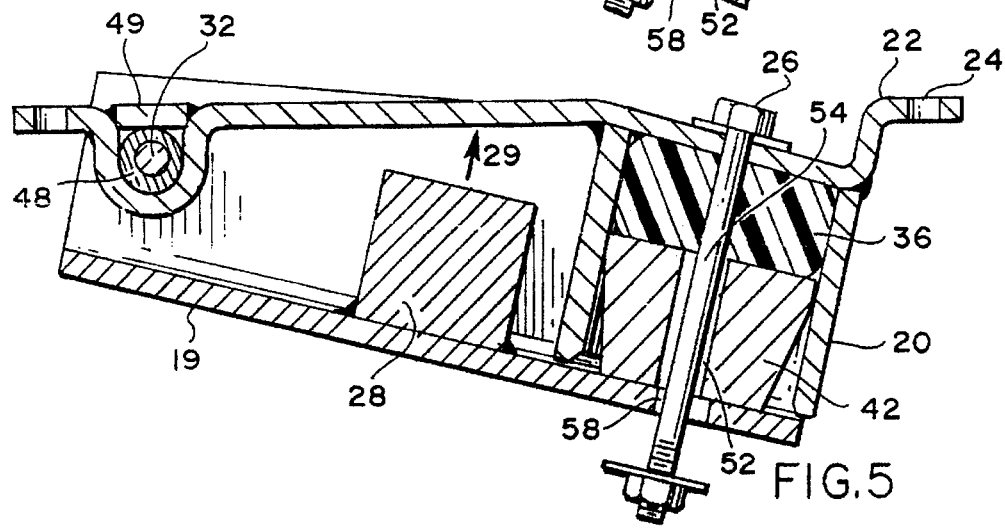
FIG. 5 is a cut away side view showing the spring of this invention in a compressed state.

From an examination of FIG. 5, it can be seen that when spring 20 is in a compressed mode, the oversized apertures as described above are clearly needed as these oversized apertures permit the lateral movement of bolt 26 as beam 19 is moved in relation to base 22.

As can be seen in FIGS. 2–5 axle 28 is positioned on the inside of beam 19 between beam 19 and base 22. This configuration allows the trailer to sit in the lowest possible stance. Further as can be seen axle 28 is positioned between the first and second ends of both base 22 and beam 19. Because of this positioning of axle 28 the load applied to axle 28 is split between elastomeric block 36 and the pivotal connection of beam 19 with base 22. This arrangement is advantageous in that it minimizes the load applied to elastomeric block 36 and to holder 34.

That is because the axial relationship of beam 19 and base 22 changes when spring 20 is compressed all the components as described above must incorporate oversized apertures in order to permit the movement of the respected parts in relationship to each other.

As can be seen from an examination of FIGS. 4,5,6, and 7, the size relationship of block member 36 in relationship to the internal diameter of holder 34 is such that when spring 20 is compressed to a maximum degree, elastomeric block 36 deforms to such a degree that it essentially fills the inside of holder 34.

Elastomeric block 36 in the preferred embodiment of this invention is formed from a high durometer polyurethane material. The durometer of the polyurethane material or other elastomeric material utilized must be balanced to the load carrying capacity desired of spring 20.

Piston 42 in the preferred embodiment of this invention is formed from a polymeric material which is sold under the trademark Delrin. It is understood by one skilled in the art that other polymeric materials may be utilized to form piston 42 for example high density polyethylene.

In the preferred embodiment of this invention base 22 holder 34 and beam 19 are formed from sheet aluminum.

In operation when force is applied in the direction of arrow 29 to axle 28 piston 42 moves up in holder 34 thereby compressing elastomeric block 36 , thereby controling the movement of running gear 5 in relation to chassis 3 of trailer 2.

Sidewalls 38 and 40 of beam 19 are such a height that when spring 20 is in a compression mode the upper edges of side walls 38 and 40 overlap base 22 in such a manner that lateral movement of beam 19 in relation base 22 is restrticted. This prevents beam 19 from becoming misaligned with base 22 if lateral forces are applied to beam 19 when the compression degree of spring 20 varies during operation.

While various preferred embodiments have been shown or described, it is understood that there is no intent to limit the invention by such disclosure, but rather, it is intended to cover all modifications and alternate constructions falling within the spirit and scope of the invention as defined in the appended claims.

What is claimed is:

1. A spring for resiliently supporting a load between a chasis and a set of running gear comprising:

a base member having first and second ends which ends incorporates means wherein the base member may be attached to the chasis;

a beam member having a first end and a second end the first end of which is pivotly attached to the first end of said base member; said beam member being provided with an axle which is attached to the beam intermediate of its first and second ends;

a holder which is positioned between said base member and said beam member approximate the second ends of the beam member and base member;

a block of solid deformable material which is positioned in and substantially encased by said holder;

wherein the movement of the second end of the beam in relation to the second end of said base member is restricted by a fastener which passes through said block of solid deformable material and wherein one end of said fastener is secured to said base member and the other end is secured to said beam member.

2. The trailer spring of claim 1 wherein the holder is secured to the base member.

3. The trailer of claim 2 wherein a piston is positioned between the block of said deformable material and the beam and wherein the said piston is adapted to ride in said holder.

4. The trailer spring of claim 3 wherein the block of solid deformable material is a block of an elastomeric material and the holder is circular, the piston is formed from a polymeric material and wherein said axle is attached to the inside of the beam between the beam and the base.

5. The trailer spring of claim 2 wherein a piston is positioned between the block of solid deformable material and the beam and wherein the said piston is adapted to ride in said holder.

6. The trailer spring of claim 2 wherein the said beam member has a U shaped cross section having a byte portion and a pair of opposing side wall portions, the upper edges of said side wall portions being of such a height that they are at least abeam of the base member when the trailer spring is compressed.

7. The trailer spring of claim 1 wherein the holder is secured to the beam member.

8. The trailer spring of claim 7 wherein a piston is positioned between the block of said deformable material and the beam and wherein the said piston is adapted to ride in said holder.

9. The trailer spring of claim 8 wherein the block of solid deformable material is a block of an elastomeric material a the holder is circular, the piston is formed from a polymeric material and wherein said axle is attached to the inside of the beam between the beam and the base.

10. The trailer spring of claim 7 wherein a piston is positioned between the block of said deformable material and the beam and wherein the said piston is adapted to ride in said holder.

11. The trailer spring of claim 1 wherein a piston is positioned between the block of solid deformable material and the beam and wherein the said piston is adapted to ride in said holder.

12. The trailer spring of claim 4 wherein the block of solid deformable material is a block of an elastomeric material, the holder is circular, the piston is formed from a polymeric material and wherein said axle is attached to the inside of the beam between the beam and the base.

13. The trailer spring of claim 12 wherein the said beam member has a U shaped cross section having a byte portion and a pair of opposing side wall portions, the upper edges of said side wall portions being of such a height that they are at least abeam of the base member when the trailer spring is compressed.

14. The trailer spring of claim 11 herein the said beam member has a U shaped cross section having a byte portion and a pair of opposing side wall portions, the upper edges of said side wall portions being of such a height that they are at least abeam of the base member when the trailer spring is compressed.

15. The trailer spring of claim 1 wherein the block of solid deformable material is a block of an elastomeric material.

16. The trailer spring of claim 15 wherein the said beam member has a U shaped cross section having a byte portion and a pair of opposing side wall portions, the upper edges of said side wall portions being of such a height that they are at least abeam of the base member when the trailer spring is compressed.

17. The trailer spring of claim 1 wherein the said beam member has a U shaped cross section having a byte portion and a pair of opposing side wall portions, the upper edges of said side wall portions being of such a height that they are at least abeam of the base member when the trailer spring is compressed.

18. The trailer spring of claim 17 wherein the side wall portions of the beam member incorporate a pair of apertures which are approximate the second end of said beam and an axle is secured in said pair of apertures.

19. A trailer spring for resiliently supporting a load between the chassis of a trailer and the running gear of said trailer comprising;

a base member having first and second ends which ends incorporate means wherein the base member may be attached to said trailer chassis, the first end of said base member having a transverse journal in which is positioned a pair of bearings;

a beam member having a first end and a second end the first end of which is pivitoly attached to the first end said base member by a bolt which poses through said beam member and through said journal and bearings said beam member being provided with an axle which is attached to the beam intermediate of its first and second ends and between the beam and the base;

a circular holder which is positioned between said base member and said beam member and is secured to said base member aproximate its second end;

an elastomeric block of a deformable, polyurethane material which is positioned in said holder;

a circular piston which is positioned in said circular holder and which is biased against said rectangular block;

the second ends of said base member and beam member being secured to each other by a bolt and nut which passes through apertures which are integral with said base member, said beam member, said piston and said rectangular block;

wherein said base member, said beams and said holder are formed from aluminum and said piston is formed from a polymeric material.

* * * * *